United States Patent
Komura et al.

(10) Patent No.: US 6,629,058 B2
(45) Date of Patent: Sep. 30, 2003

(54) FAULT DIAGNOSIS METHOD AND APPARATUS

(75) Inventors: Hidemichi Komura, Kokubunji (JP); Kazuo Shibata, Kokubunji (JP); Kazuhiro Shimomura, Kokubunji (JP)

(73) Assignee: Rion Co., Ltd., Tokyo (JP)

( * ) Notice: Subject to any disclaimer, the term of this patent is extended or adjusted under 35 U.S.C. 154(b) by 90 days.

(21) Appl. No.: 09/836,830

(22) Filed: Apr. 17, 2001

(65) Prior Publication Data
US 2001/0037180 A1 Nov. 1, 2001

(30) Foreign Application Priority Data
Apr. 20, 2000 (JP) ........................................ 2000-119659

(51) Int. Cl.[7] ............................................... G06F 11/32
(52) U.S. Cl. ......................................... 702/183; 714/47
(58) Field of Search .............................. 702/33–36, 58, 702/59, 66, 75, 76, 182–185; 714/47, 48, 57

(56) References Cited

U.S. PATENT DOCUMENTS

| | | | | |
|---|---|---|---|---|
| 4,366,544 A | * | 12/1982 | Shima et al. ................. 702/56 |
| 5,210,704 A | * | 5/1993 | Husseiny ..................... 702/34 |
| 5,602,761 A | * | 2/1997 | Spoerre et al. .............. 702/179 |
| 5,852,793 A | * | 12/1998 | Board et al. .................. 702/56 |
| 6,053,047 A | * | 4/2000 | Dister et al. ................. 73/593 |
| 6,195,621 B1 | * | 2/2001 | Bottomfield ................ 702/183 |
| 6,321,602 B1 | * | 11/2001 | Ben-Romdhane ............ 73/660 |
| 6,484,109 B1 | * | 11/2002 | Lofall ......................... 702/56 |

* cited by examiner

*Primary Examiner*—Marc S. Hoff
*Assistant Examiner*—Edward Raymond
(74) *Attorney, Agent, or Firm*—Carrier, Blackman & Associates, P.C.; Joseph P. Carrier; William D. Blackman

(57) ABSTRACT

A fault diagnosis apparatus comprises a vibration sensor for detecting vibration waveforms being generating by machinery or equipment, a cumulative frequency computing device for obtaining a cumulative frequency distribution curve of an absolute value of the vibration waveforms detected by the vibration sensor, a maximum value detecting device for obtaining a maximum value $x_p$ of the vibration waveforms detected by the vibration sensor, a peak ratio computing device for obtaining the peak ratio $\beta_1$ of an equivalent effective value $\sigma_{eq}$ in the cumulative frequency distribution curve computed by the cumulative frequency computing device to the maximum value $x_p$ computed by the maximum value detecting device, and a fault diagnosing device for diagnosing the degree of fault of the machinery or equipment from the magnitude of the peak ratio $\beta_1$ computed by the peak ratio computing device.

16 Claims, 8 Drawing Sheets

FAULT DIAGNOSIS METHOD AND APPARATUS

BACKGROUND OF THE INVENTION

1. Field of the Invention

The present invention relates to a method and apparatus for diagnosing a fault in a piece of machinery or equipment due to frictional wear, which generates vibrations at a high frequency, as a result of a failure in a rotating, metallic machine element, such as bearings and gears and a lubricant, or as a result of belt slippage in the rotating machine.

2. Description of the Prior Art

A sudden shutdown of production machinery or equipment can be a primary factor in a major accident, and/or it can bring about an extremely large economic loss. At a production site, preventive maintenance is practiced to prevent such a sudden shutdown. As preventive maintenance for avoiding a fault, there is a method called "condition-based maintenance" that grasps the condition of the machinery or equipment by measuring sounds or vibrations being generated by the machinery or equipment in operation. Here, a conventional type of condition-based maintenance will be described, taking vibration measurement as an example.

When measuring vibrations in machinery or equipment to diagnose the existence of a fault, a decision is made as to whether or not the amplitude of the measured vibration exceeds a reference value. Normally, two kinds of reference values are provided for such a decision. If the measured vibration amplitude exceeds the smaller of the reference values, this is considered to be in the domain of caution, wherein operation can be continued, provided that monitoring is frequently performed. On the other hand, if the measured vibration amplitude exceeds the larger of the reference values, this is considered to be in the domain of danger, wherein the operation must be immediately shut down for the machinery or equipment to be repaired.

When the condition of the machinery or equipment reaches the domain of caution, the time when the condition will reach the domain of danger is first estimated from a chart indicating a past tendency of changes from a normal state into the domain of caution. Then, production planning and maintenance planning with the highest economic efficiency are made to carry out the necessary repair.

There are various kinds of machinery or equipment for use in production in a company for which the specifications such as the number of revolutions, electric power consumption, and load vary with the purpose of use. There are also many machines of different shapes and sizes of which the amplitude of vibrations is large or small.

The reference value for decision in diagnosing the existence of a fault is peculiar to each of these pieces of machinery and equipment and is determined by accumulating a quantity of case sample data under fault conditions as well as under normal conditions.

An optimum reference value for decision is therefore needed to show the effect of the condition-based maintenance.

However, there are many companies which cannot determine a reference value for a decision to adopt condition-based maintenance on the grounds that the case sample data during a fault cannot be obtained because the machinery or equipment rarely breaks down. It therefore requires a great deal of labor to determine the reference value for a decision because there are many kinds of machinery or equipment to be diagnosed, and there are no maintenance technicians with much diagnostic knowledge, and the like.

Further, though condition-based maintenance is an economically superior method of maintenance because it can lower the maintenance cost, there are still many companies which cannot determine the reference value for a decision to adopt the condition-based maintenance because the optimum reference value for such a decision is needed to utilize condition-based maintenance as described above.

SUMMARY OF THE INVENTION

It is therefore an object of the present invention to solve these problems found in the prior art and to provide a method and apparatus for diagnosing a fault without taking specifications of machinery such as the number of revolutions, electric power consumption, load, and the scale of construction into account.

According to a first aspect of the present invention, a fault diagnosis method is provided, which comprises the steps of detecting vibration waveforms being generated by machinery or equipment, obtaining the ratio ($\beta_1$) of a certain specific absolute value of the vibration waveforms in a cumulative frequency distribution curve to a maximum value ($X_p$) of the vibration waveforms, and diagnosing the degree of fault in the machinery or equipment from the magnitude of the ratio ($\beta_1$).

According to a second aspect of the present invention, a fault diagnosis method is provided, which comprises the steps of detecting vibration waveforms being generated by machinery or equipment, obtaining the ratio ($\beta_2$) of a certain specific absolute value of the vibration waveforms to an effective value ($\sigma$) of the vibration waveforms, and diagnosing the degree of a fault of the machinery or equipment from the scale of the ratio ($\beta_2$).

According to a third aspect of the present invention, a fault diagnosis method is provided, which comprises the steps of detecting vibration waveforms being generated by machinery or equipment, obtaining a root-mean-cubic value ($\beta_3$) and a root-mean-quartic value ($\beta_4$) which are statistics from data in which the vibration waveforms obtained are normalized at a certain specific absolute value of the vibration waveforms in a cumulative frequency distribution curve, and diagnosing the degree of fault in the machinery or equipment from the magnitude of the root-mean-cubic value ($\beta_3$) and the root-mean-quartic value ($\beta_4$).

According to a fourth aspect of the present invention, in any of the fault diagnosis methods above, the certain specific absolute value of the vibration waveforms in the cumulative frequency distribution curve is a value (an equivalent effective value: $\sigma_{eq}$) of 68.3% of the cumulative frequency.

According to a fifth aspect of the invention, a fault diagnosis apparatus is provided, which comprises vibration detecting means for detecting vibration waveforms being generated by machinery or equipment, cumulative frequency computing means for obtaining a cumulative frequency distribution curve of an absolute value of vibration waveforms detected by this vibration detecting means, maximum value detecting means for obtaining a maximum value ($X_p$) of the vibration waveforms detected by the vibration detecting means, peak ratio computing means for obtaining the peak ratio ($\beta_1$) of a certain specific value in the cumulative frequency distribution curve computed by the cumulative frequency computing means to the maximum value ($X_p$) computed by the maximum value detecting means, and fault diagnosing means for diagnosing the degree of fault of the machinery or equipment from the scale of the peak ratio ($\beta_1$) computed by this peak ratio computing means.

According to a sixth aspect of the present invention, a fault diagnosis apparatus is provided, which comprises vibration detecting means for detecting vibration waveforms being generated by machinery or equipment, cumulative frequency computing means for obtaining a cumulative frequency distribution curve of an absolute value of the vibration waveforms detected by this vibration detecting means, effective value computing means for obtaining an effective value ($\sigma$) of the vibration waveforms detected by the vibration detecting means, effective value ratio computing means for obtaining an effective value ratio ($\beta_2$) of a certain specific value in the cumulative frequency distribution curve computed by the cumulative frequency computing means to the effective value ($\sigma$) computed by the effective value computing means, and fault diagnosing means for diagnosing the degree of fault of the machinery or equipment from the scale of the effective value ratio ($\beta_2$) computed by this effective value ratio computing means.

According to a seventh aspect of the present invention, a fault diagnosis apparatus is provided, which comprises vibration detecting means for detecting vibration waveforms being generated by machinery or equipment, cumulative frequency computing means for obtaining a cumulative frequency distribution curve of an absolute value of the vibration waveforms detected by this vibration detecting means, normalizing means for normalizing the vibration waveforms obtained at a certain specific value in the cumulative frequency distribution curve computed by this cumulative frequency computing means, root-mean-cubic value and root-mean-quartic value computing means for obtaining a root-mean-cubic value ($\beta_3$) and a root-mean-quartic value ($\beta_4$) from data normalized by this normalizing means, fault diagnosing means for diagnosing the degree of fault of the machinery or equipment from a scale (size) of the root-mean-cubic value ($\beta_3$) and the root-mean-quartic value ($\beta_4$) computed by the root-mean-cubic value and root-mean-quartic value computing means.

According to a eighth aspect of the present invention, in any of the fault diagnosis apparatus above, the certain specific value of the absolute value of the vibration waveforms in the cumulative frequency distribution curve is a value (an equivalent effective value: $\sigma_{eq}$) of 68.3% of the cumulative frequency.

BRIEF DESCRIPTION OF THE DRAWINGS

The above and other objects, features and advantages of the present invention will become more apparent from the following description when taken in conjunction with the accompanying drawings.

DETAILED DESCRIPTION OF THE PREFERRED EMBODIMENTS

Figure 1:
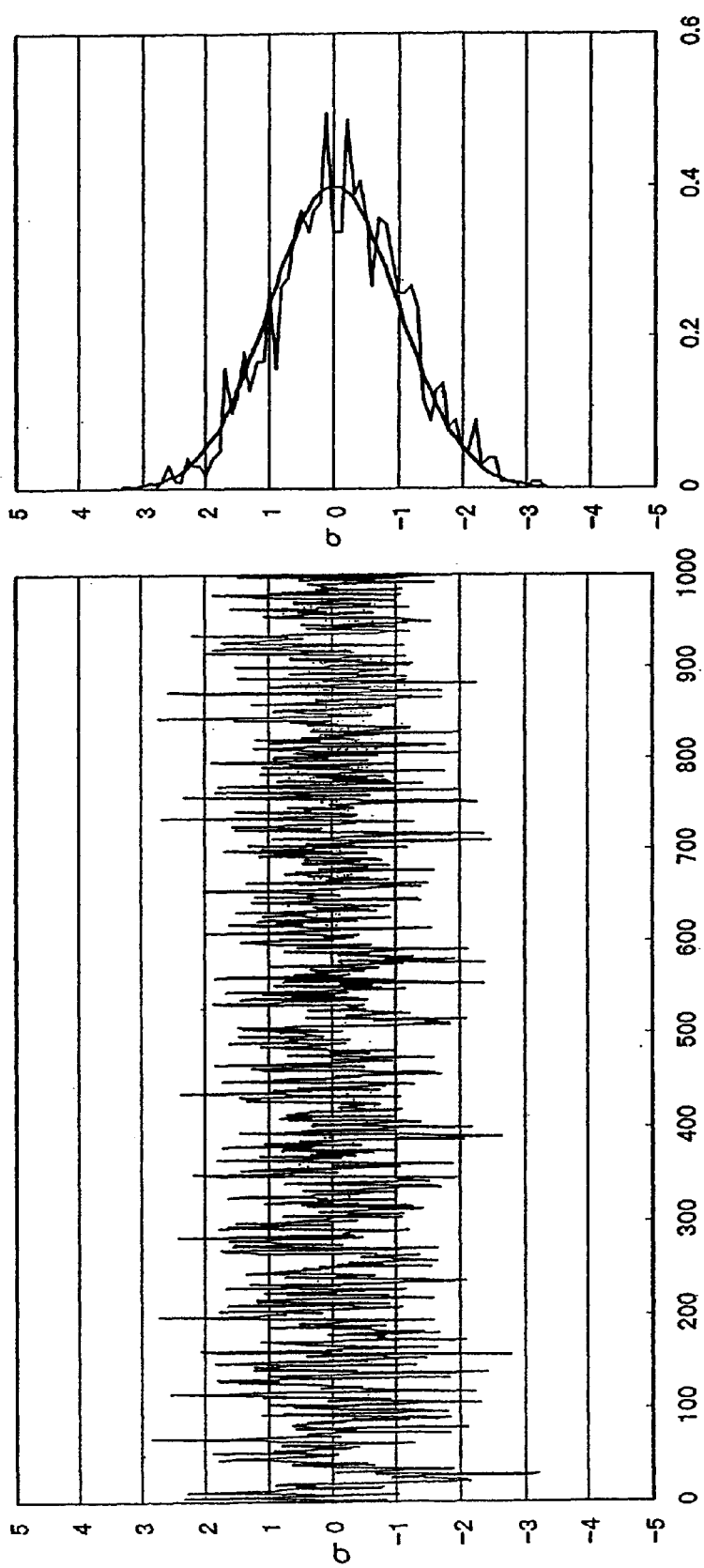
FIG. 1 is a view showing vibration acceleration waveforms (a) being generated by a normal bearing and its amplitude probability density function (b)
Figure 2:
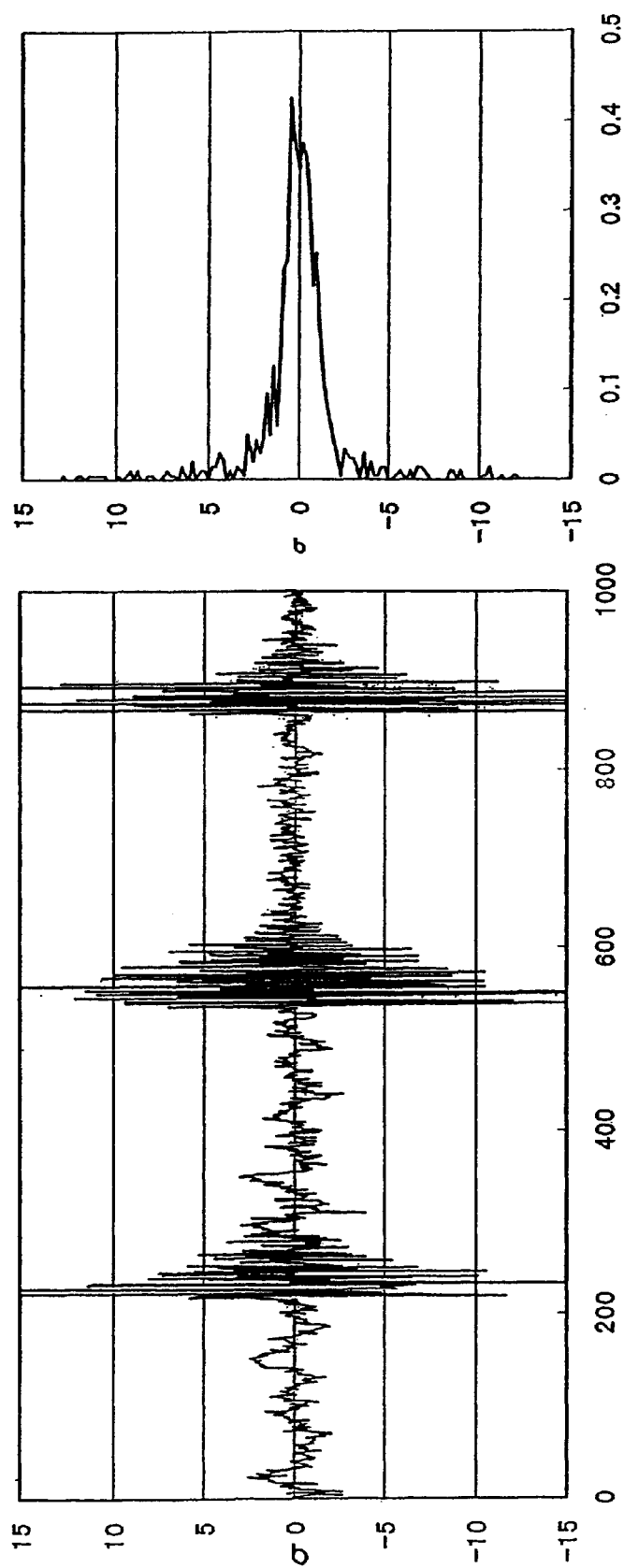
FIG. 2 is a view showing vibration acceleration waveforms (a) being generated by a bearing in which the transmission surface has a flaw and its amplitude probability density function (b)
Figure 3:
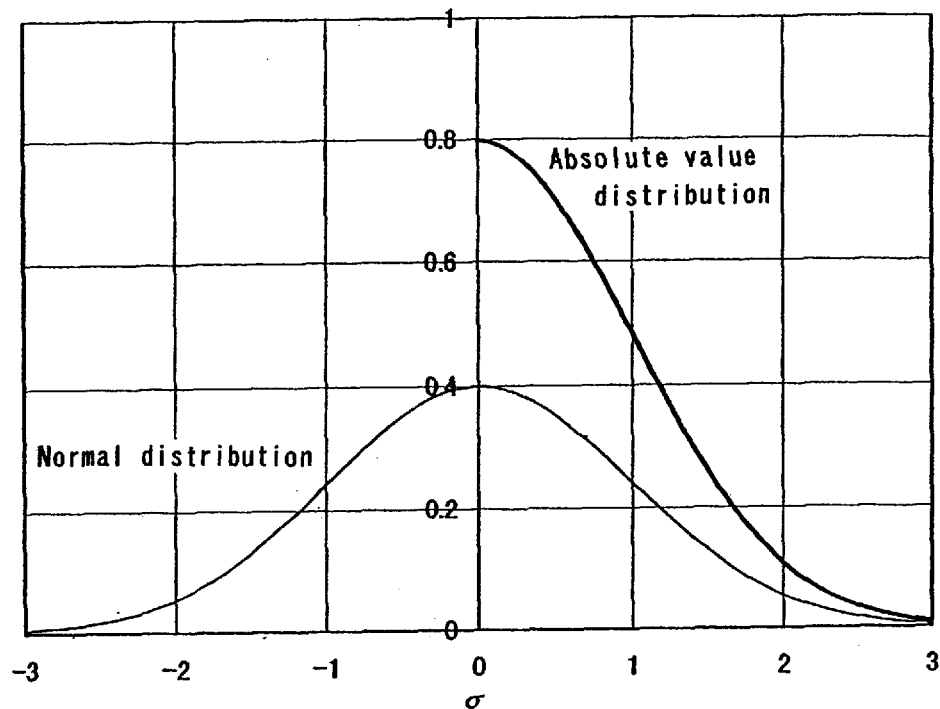
FIG. 3 is a view explaining the relationship between a normal distribution and an absolute value distribution which is obtained by processing the normal distribution.
Figure 4:
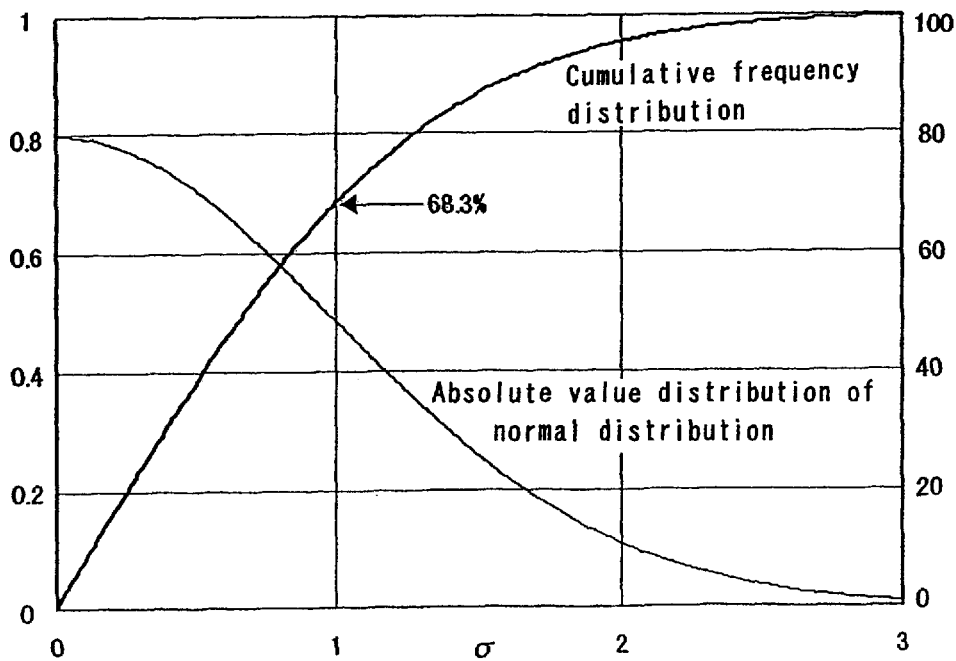
FIG. 4 is a view explaining the relationship between the absolute value distribution shown in FIG. 3 and a cumulative frequency distribution.
Figure 5:
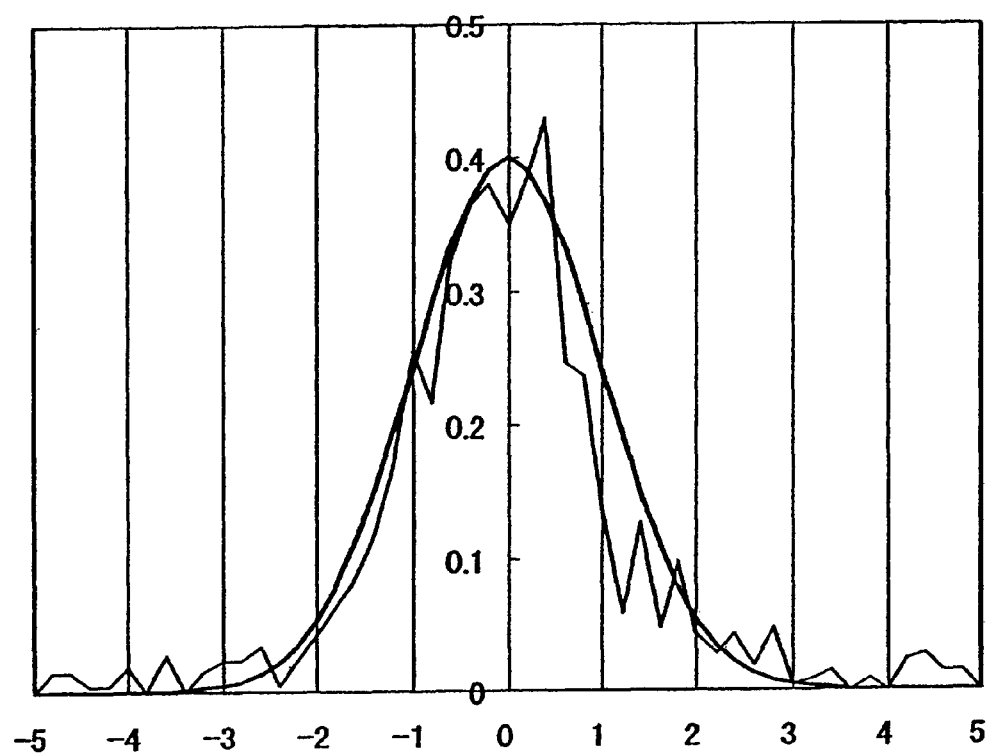
FIG. 5 is a view explaining the relationship between the amplitude probability density function of a normal section shown in FIG. 2 and the normal distribution.
Figure 6A:
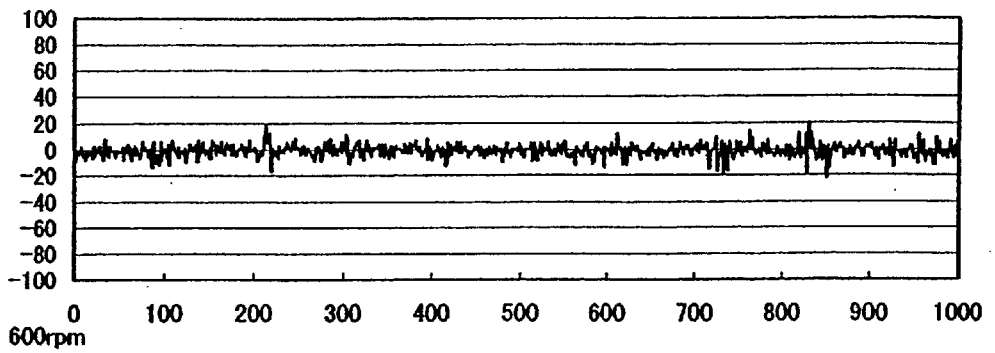
FIG. 6 is a view showing vibration acceleration waveforms being generated by a normal bearing, in which (a) shows the number of revolutions being 600 rpm, (b) shows the number of revolutions being 1000 rpm, and (c) shows the number of revolutions being 1400 rpm.
Figure 6B:
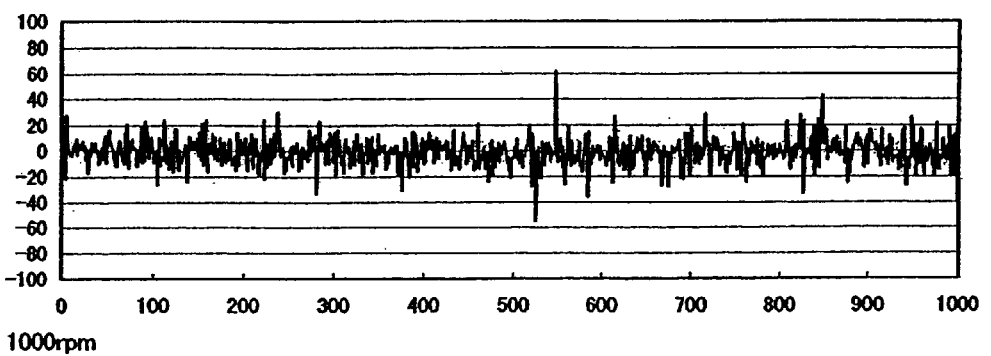
Figure 6C:
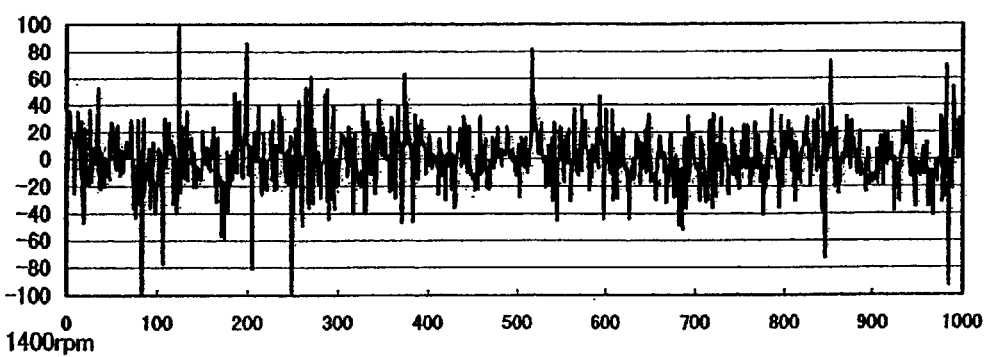
Figure 7A:
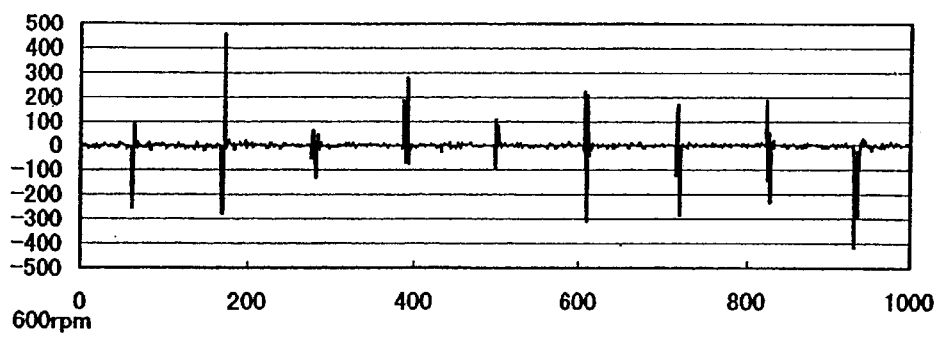
FIG. 7 is a view showing vibration acceleration waveforms being generated by a bearing in which the outer ring has a defect in which (a) shows the number of revolutions being 600 rpm, (b) shows the number of revolutions being 1000 rpm, and (c) shows the number of revolutions being 1400 rpm.
Figure 7B:
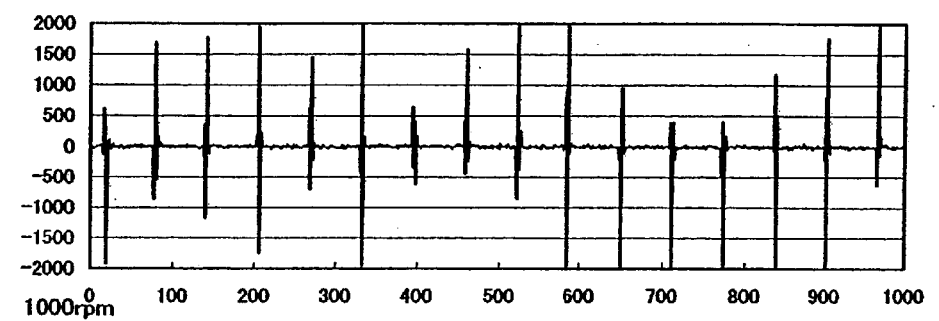
Figure 7C:
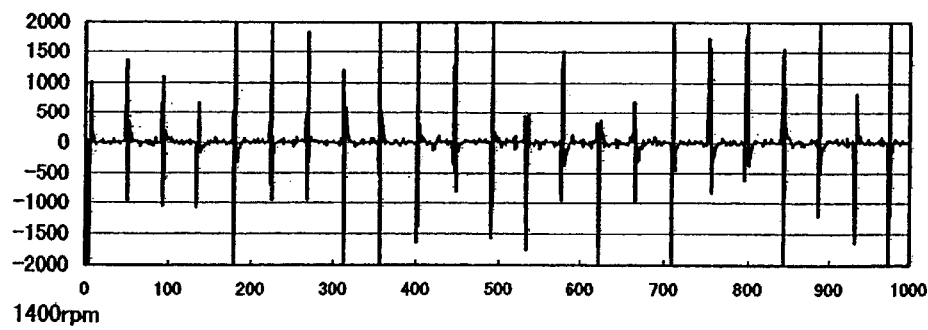
Figure 8:
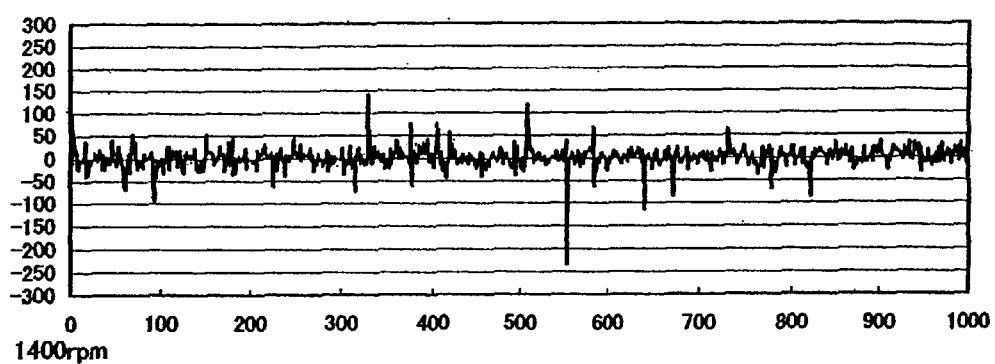
FIG. 8 is a view showing vibration acceleration waveforms being generated by a bearing with a medium-sized flaw running at 1400 rpm.
Figure 9:
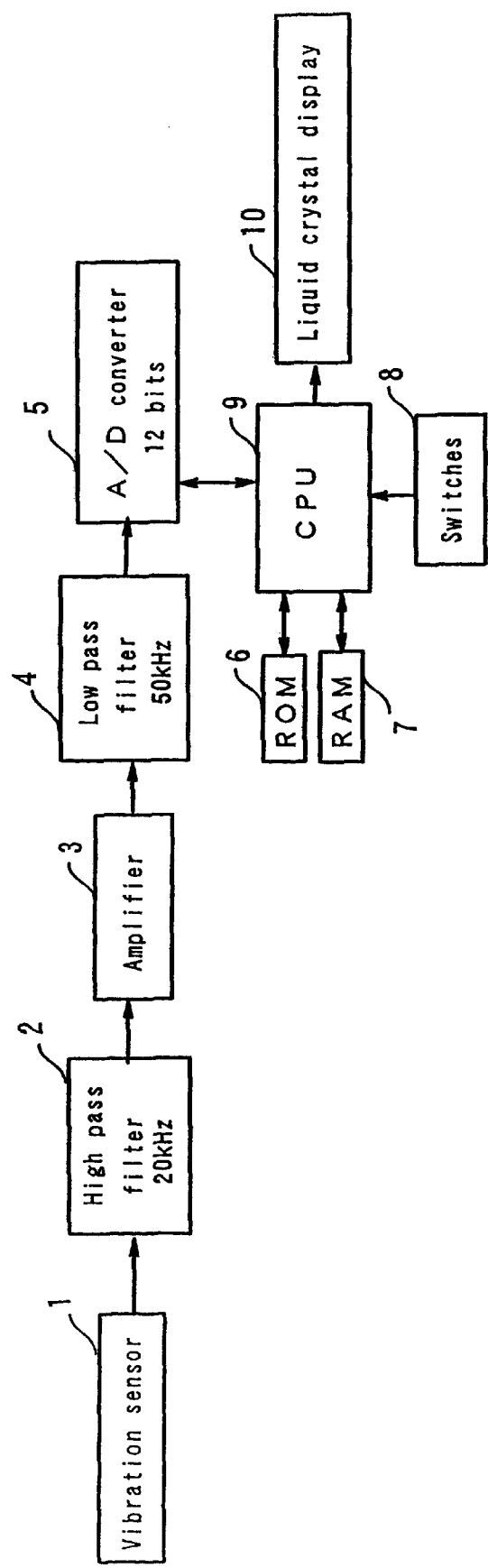
FIG. 9 is a block diagram of a fault diagnosis apparatus according to the present invention.

Preferred embodiments of the present invention will now be described with reference to the accompanying drawings. FIG. 1 is a view showing vibration acceleration waveforms (a) being generated by a normal bearing and its amplitude probability density function (b). FIG. 2 is a view showing vibration acceleration waveforms (a) being generated by a bearing in which the transmission surface has a flaw and its amplitude probability density function (b). FIG. 3 is a view explaining the relationship between a normal distribution and an absolute value distribution which is obtained by processing the normal distribution. FIG. 4 is a view explaining the relationship between the absolute value distribution shown in FIG. 3 and a cumulative frequency distribution. FIG. 5 is a view explaining the relationship between an amplitude probability density function of a normal section shown in FIG. 2 and the normal distribution. FIG. 6 is a view showing vibration acceleration waveforms being generated by a normal bearing and FIG. 7 is a view showing vibration acceleration waveforms being generated by a bearing with a defect on its outer ring. FIG. 8 is a view showing vibration acceleration waveforms being generated by a bearing with a medium-sized flaw. FIG. 9 is a block diagram of a fault diagnosis apparatus according to the present invention.

The present invention is based on a principle that an amplitude probability density function of the vibration being generated by machinery or equipment under normal conditions exhibits a normal distribution, while it is out of normal distribution when the machinery or equipment breaks down or enters abnormal conditions.

Now, when the amplitude probability density function is obtained from the vibration acceleration waveforms (1,000 pieces of sampling data are shown here) being generated by a normal bearing as shown in FIG. 1(a), it substantially agrees with the normal distribution as shown in FIG. 1(b). In the figure, $\sigma=1$ shows a standard deviation (i.e. effective value).

Also, there is some possibility of the bearing producing a failure on the transmission surface due to rolling fatigue, inclusion of a foreign substance, or the like. Accordingly, if the bearing with such a failure is rotated, impact vibrations are generated for each passing of the defect point (flaw) so as to produce the vibration acceleration waveforms (1,000 pieces of sampling data are shown here) as shown in FIG. 2(a). The amplitude probability density function obtained from the vibration acceleration waveforms is shown in FIG. 2(b).

In FIG. 2(b), if $\sigma=1$ is an effective value of vibration of the bearing under normal conditions, this amplitude probability density function p(x) can be expressed as the sum of a normal distribution density function r(x), which is an ordinary component, and a density function r(x), which is a failure component, as shown in the following expression (1):

$$p(x)=q(x)+r(x) \quad (1)$$

In the normal method, it is not possible to measure the effective value a under normal conditions from an arbitrary density function p(x).

Therefore, a value equivalent to the effective value ☐ under normal conditions is obtained by the following method. First, the amplitude probability density function f(x) of the normal distribution N ($\mu$, $\sigma^2$) of which the average value is $\mu$ and the dispersion is $\sigma^2$ can be expressed by the following expression (2):

$$f(x) = \frac{1}{\sigma\sqrt{2\pi}} e^{-\frac{(x-\mu)^2}{2\sigma^2}} \quad (2)$$

Here, by normalizing so that the average value $\mu=0$ and the dispersion $\sigma^2=1$ to have N (0, 1), the amplitude probability density function can be expressed by the following expressions (3) and (4):

$$f(x) = \frac{1}{\sqrt{2\pi}} e^{-\frac{x^2}{2}} \quad (3)$$

$$q(x) = e^{-\frac{x^2}{2}} \quad (4)$$

Now, as shown in FIG. 3, even if the absolute value of the normal distribution is obtained so that the absolute value distribution is only on the plus side, the position of the standard deviation $\sigma=1$ does not change.

Next, the cumulative frequency distribution k (x) is obtained from the amplitude of 0, as shown in FIG. 4. The cumulative frequency n at a point of the standard deviation $\sigma=1$ from the cumulative frequency distribution k (x) can be obtained by the following expressions (5) and (6):

$$k(x) = \int_0^\pi |q(x)| dx \quad (5)$$

$$n = \frac{\int_0^{\sigma=1} |q(x)| dx}{\int_0^\infty |q(x)| dx} = 0.683 \quad (6)$$

If the amplitude probability density function is the normal distribution, the cumulative frequency n up to the point of the standard deviation $\sigma=1$ is 68.3% from the expression (6). In other words, it is possible to say that the value of 68.3% of the cumulative frequency is the effective value $\sigma$ in the amplitude probability density function of vibrations being generated by a normal machine.

In the flawed bearing as shown in FIG. 2, if the influence of the flaw on the impact vibration is less than 31.7% of the whole at an hourly rate, when the value of 68.3% at the cumulative frequency from the amplitude probability density function of this vibration is obtained, it is possible to say that the value obtained is equivalent to the effective value a of this bearing under normal conditions.

Here, in the amplitude probability density function of the vibration, the value of 68.3% of the cumulative frequency is defined as an equivalent effective value or an equivalent root-mean-square (Equivalent rms : $\sigma_{eq}$).

FIG. 5 graphically shows that in the amplitude probability density-function of the flawed bearing shown in FIG. 2, a point of 68.3% of the cumulative frequency and a point of the standard deviation $\sigma=1$ of the normal distribution coincide. The correlation is high in a range of $\sigma=-1\sim+1$ and it can be considered as the amplitude probability density function by the vibration under normal conditions.

As shown in the following expressions (7) to (10), by obtaining a peak ratio $\beta_1$ which is the ratio of a maximum value $x_p$ of the absolute value of the vibration waveforms to the equivalent effective value $\sigma_{eq}$, an effective value ratio $\beta_2$ which is the ratio of the effective value $\sigma$ obtained from the vibration waveforms to the equivalent effective value $\sigma_{eq}$, or by normalizing the obtained vibration waveform data with the equivalent effective value $\sigma_{eq}$ to obtain a statistical mean value of the third power $\beta_3$ and a mean value of the fourth power $\beta_4$, it is possible to obtain dimensionless deterioration parameters $\beta_1$, $\beta_2$, $\beta_3$ and $\beta_4$ compared with the normal conditions.

$$\beta_1 = \frac{x_p}{\sigma_{eq}} \quad (7)$$

$$\beta_2 = \frac{\left\{\frac{\sum_{i=1}^n (x_i - \bar{x})^2}{n-1}\right\}^{\frac{1}{2}}}{\sigma_{eq}} \quad (8)$$

$$\beta_3 = \frac{\left\{\frac{\sum_{i=1}^n (x_i - \bar{x})^3}{n-1}\right\}}{\sigma_{eq}^3} \quad (9)$$

$$\beta_4 = \frac{\left\{\frac{\sum_{i=1}^n (x_i - \bar{x})^4}{n-1}\right\}}{\sigma_{eq}^4} \quad (10)$$

The decision criterion is established with respect to the size of these dimensionless deterioration parameters $\beta_1$, $\beta_2$, and $\beta_3$, wherein a first decision method for diagnosing a fault by the decision criterion (1) of the size of $\beta_1$, a second decision method for diagnosing the fault by the decision criterion (2) of the size of $\beta_2$, and a third decision method for diagnosing the fault by the decision criterion (3) of the size of $\beta_3$ and $\beta_4$ are respectively established. The following decision criteria (1), (2), and (3) are established based on the normal operating cases and the fault cases of many pieces of machinery or equipment which are actually operating.

In the decision criterion (1) of the first decision method, $\beta_1 < 14$ is defined as normal, $\beta_1 \geq 14$ is defined as caution, and $\beta_1 \geq 42$ is defined as fault.

In the decision criterion (2) of the second decision method, $\beta_2 < 3$ is defined as normal, $\beta_2 \geq 3$ as caution, and $\beta_2 \geq 6$ as fault.

In the decision criterion (3) of the third decision method, $\beta_3 < 15$ and $\beta_4 < 20$ are defined as normal, $\beta_3 \geq 15$ or $\beta_4 \geq 20$ as caution, and $\beta_3 \geq 45$ or $\beta_4 \geq 60$ as a fault.

Since the dimensionless deterioration parameters $\beta_1$, $\beta_2$, $\beta_3$, and $\beta_4$ are relative values which do not depend on the amplitude of the vibration, these decision criteria can be applied without respect to the electric power and the number of revolutions of the machinery or equipment.

Next, the fault diagnosis method according to the present invention is applied to vibration acceleration waveforms (1,000 pieces of sampling data are shown) being generated by a normal bearing shown in FIG. 6. In FIG. 6, (a) is vibration acceleration waveforms of 600 rpm, (b) is vibration acceleration waveforms of 1000 rpm, and (c) is vibration acceleration waveforms of 1400 rpm.

In the vibration acceleration waveforms at 600 rpm, the maximum value $x_p=46$, the effective value $\sigma=4.59$, and the equivalent effective value $\sigma_{eq}=3.9$.

Accordingly, in the decision criterion (1), $\beta_1=11.8$ and is diagnosed as "normal". In the decision criterion (2), $\beta_2=1.2$ and is diagnosed as "normal". In the decision criterion (3), $\beta_3=0.01$ and $\beta_4=13.6$ and are diagnosed as "normal".

In the vibration acceleration waveforms at 1000 rpm, the maximum value $x_p=75$, the effective value $\sigma=11.0$, and the equivalent effective value $\sigma_{eq}=9.7$.

Accordingly, in the decision criterion (1), $\beta_1=7.7$ and is diagnosed as "normal", and in the decision criterion (2), $\beta_2=1.1$ and is diagnosed as "normal". In the decision criterion (3), $\beta_3=-0.23$ and $\beta_4=6.3$ and are diagnosed as "normal".

In the vibration acceleration waveforms at 1400 rpm, the maximum value $x_p=153$, the effective value $\sigma=20.8$, and the equivalent effective value $\sigma_{eq}=18.2$.

Accordingly, in the decision criterion (1) $\beta_1=8.4$ and is diagnosed as "normal" and in the decision criterion (2), $\beta_2=1.1$ and is diagnosed as "normal". In the decision criterion (3), $\beta_3=-0.47$ and $\beta_4=7.4$ and are diagnosed as "normal".

As shown in the above-mentioned examples, if the number of revolutions per minute changes using the same bearing, the maximum value $x_p$ and the effective value $\sigma$ of the absolute value of the vibration waveforms to be measured also change remarkably. However, since the equivalent effective value $\sigma_{eq}$ which is computed at that time also changes in the same ratio, these are all diagnosed as "normal".

Next, a fault diagnosis method according to the present invention is applied to the vibration acceleration waveforms (1,000 pieces of sampling data are shown) being generated by a bearing of which the outer ring has a failure as shown in FIG. 7. In FIG. 7, (a) shows the vibration acceleration waveforms of 600 rpm, (b) shows those of 1000 rpm, and (c) shows those of 1400 rpm.

In the vibration acceleration waveforms at 600 rpm, the maximum value $x_p=775$, the effective value $\sigma=53.4$, and the equivalent effective value $\sigma_{eq}=7.0$.

Accordingly, in the decision criterion (1), $\beta_1=111$ and is diagnosed as "fault", in the decision criterion (2), $\beta_2=7.6$ and is diagnosed as "fault". In the decision criterion (3), $\beta_3=-40.0$ and $\beta_4=2.0\times10^5$ and are diagnosed as "fault".

In the vibration acceleration waveforms at 1000 rpm, the maximum value $x_p=2052$, the effective value $\sigma=290$, and the equivalent effective value $\sigma_{eq}=18.3$.

Accordingly, in the decision criterion (1), $\beta_1=112$ and is diagnosed as "fault", and in the decision criterion (2), $\beta_2=15.8$ and is diagnosed as "fault". In the decision criterion (3), $\beta_3=-525$ and $\beta_4=2.1\times10^6$ and are diagnosed as "fault".

In the vibration acceleration waveforms at 1400 rpm, the maximum value $x_p=2052$, the effective value $\sigma=376$, and the equivalent effective value $\sigma_{eq}=42.7$.

Accordingly, in the decision criterion (1), $\beta_1=48$ and is diagnosed as "fault" and in the decision criterion (2), $\beta_2=8.8$ and is diagnosed as "fault". In the decision criterion (3), $\beta_3=-53.5$ and $\beta_4=1.3\times10^5$ and are diagnosed as "fault".

At 1000 rpm and 1400 rpm, saturation occurs in an analog system. Though the maximum value $x_p$ of the vibration acceleration waveforms is not accurate, as shown in the foregoing examples, all results have been diagnosed as "fault" even if the number of revolutions is changed using the same bearing.

Next, a fault diagnosis method according to the present invention is applied to vibration acceleration waveforms (1000 pieces of sampling data are shown) being generated by a bearing with a medium-sized flaw shown in FIG. 8. Here, vibration acceleration waveforms are shown at 1400 rpm.

In the vibration acceleration waveforms at 1400 rpm, the maximum value $x_p=234$, the effective value $\sigma=20.9$, and the equivalent effective value $\sigma_{eq}=15.6$.

Accordingly, in the decision criterion (1), $\beta_1=15.0$ and is diagnosed as "caution" and in the decision criterion (2), $\beta_2=1.3$ and is diagnosed as "normal", while in the decision criterion (3), $\beta_3=-1.3$ and $\beta_4=48$ and are diagnosed as "caution".

In the example shown in FIG. 8, both the first decision method the third decision method have the same diagnosis results of "caution", but these are different from the second decision method of which the diagnosis result was "normal". However, it is to be noted that this example is within the limits of a permissible range in which it does not matter whether the diagnosis is "normal" or "caution".

In this manner, the diagnosis may be different in the border area among these three decision methods (the first decision method to third decision method), but the different decision area is quite narrow.

To make these areas narrower, it is possible to diagnose the fault using decision results from the three decision methods at the same time.

Next, a fault diagnosis apparatus according to the present invention is provided, as shown in FIG. 9, which comprises a piezoelectric vibration sensor 1 for detecting vibration acceleration being generated by a machine, a high pass filter 2 for passing a frequency component greater than 20 kHz, an amplifier 3, a low pass filter 4 for passing a frequency component less than 50 kHz, an A/D converter 5 of 12 bits, a memory (ROM) 6 for storing a control program and a processing program, a memory (RAM) 7 for storing A/D converted data and a decision result, switches 8 for inputting instructions such as start of diagnosis, a central processing unit (CPU) 9 for arithmetic processing and inputting and outputting data, and a liquid crystal display 10 for indicating the decision result.

A vibration detecting means consists of the vibration sensor 1, the high pass filter 2, the amplifier 3, the low pass filter 4, and the A/D converter 5 and is adapted to detect, as a digital signal, vibration acceleration being generated by machinery or equipment of which the frequency component is greater than 20 kHz and less than 50 kHz.

Further, the fault diagnosis apparatus according to the present invention comprises a cumulative frequency computing means for obtaining a cumulative frequency distribution curve of an absolute value of a vibration acceleration waveform by the ROM 6, RAM 7 and CPU 9, a maximum value detecting means for obtaining a maximum value $x_p$ for the vibration acceleration waveform, an effective value computing means for obtaining an effective value $\sigma$ for the vibration acceleration waveforms, a normalizing means for normalizing the vibration acceleration waveforms obtained at an equivalent effective value $\sigma_{eq}$, a peak ratio computing means for obtaining the peak ratio $\beta_1$ of the equivalent effective value $\sigma_{eq}$ in the cumulative frequency distribution curve to the maximum value $x_p$, effective value ratio computing means for obtaining the effective value ratio $\beta_2$ of the equivalent effective value $\sigma_{eq}$ to the effective value $\sigma$, root-mean-cubic value and root-mean-quartic value computing means for obtaining a root-mean-cube value $\beta_3$ and a root-mean-quartic value $\beta_4$ from normalized data, a fault diagnosing means for diagnosing the degree of fault of the machinery or equipment from the magnitude of the peak ratio $\beta_1$ or the effective value ratio $\beta_2$, or the root-mean-cubic value $\beta_3$ and the root-mean-quartic value $\beta_4$.

The operation of the fault diagnosis apparatus constructed above will now be described.

First, the vibration acceleration of a frequency range of 20 kHz to 50 kHz being generated by machinery or equipment is obtained by passing the vibration acceleration of the machinery or equipment detected by the vibration sensor 1 through the high pass filter 2, the amplifier 3, and the low pass filter 4.

Next, the vibration acceleration obtained as an analog signal is converted to a digital signal by the A/D converter 5 and the digitized vibration acceleration is sampled for each 250□ so as to store 4096 pieces of sampling data $x_i$ in the RAM 7.

Further, an integrated value $s_1$ of the sampling data $x_i$ can be obtained by the following expression (11).

$$s_1 = \sum_{i=1}^{4096} x_i \tag{11}$$

Then, the average value $\mu$ ($\mu = s_1/4096$) is obtained. Also, the sampling data $x_i$ is shifted by the average value $\mu$ to eliminate a DC component ($x_i = x_i - \mu$).

Next, the squared integrated value $s_2$ of the sampling data $x_i$ can be obtained by the following expression (12). The effective value (root-mean-square value)$\sigma$ ($x_{rms}$) can also be obtained by the following expression (13).

$$s_2 = \sum_{i=1}^{4096} x_i^2 \tag{12}$$

$$\sigma = \sqrt{\frac{s_2}{4096}} = x_{rms} \tag{13}$$

Then, the absolute value of 4096 pieces of sampling data $x_i$ is obtained. The 2798th (=4096×0.683) piece of data counting from the smallest of the absolute value of the sampling data $x_i$ is set as the equivalent effective value $\sigma_{eq}$. Further, the sampling data $x_i$ is normalized ($x_i = x_i/\sigma_{eq}$).

Also, the maximum value $x_p$ of the absolute value of the sampling data $x_i$ is obtained.

Next, the cubic integrated value $s_3$ and the quartic integrated value $s_4$ of the sampling data $x_i$ are obtained by the following expressions (14) and (15).

$$s_3 = \sum_{i=1}^{4096} x_i^3 \tag{14}$$

$$s_4 = \sum_{i=1}^{4096} x_i^4 \tag{15}$$

Next, the dimensionless deterioration parameters $\beta_1$, $\beta_2$, $\beta_3$, and $\beta_4$ are obtained. These parameters are, the peak ratio $\beta_1 = x_p/\sigma_{eq}$, the effective value ratio $\beta_2 = \sigma/\sigma_{eq}$, the mean value of the third power $\beta_3 = s_3/4096$, and the mean value of the fourth power $\beta_4 = s_4/4096$.

Then, by the decision criteria (4) and (5) taking the magnitude of each of the dimensionless deterioration parameters $\beta_1$, $\beta_2$, $\beta_3$, and $\beta_4$ into consideration at the same time, fault diagnosis is performed.

If $\beta_1 < 14$, $\beta_2 < 3$, $\beta_3 < 15$, and $\beta_4 < 20$ (decision criterion (4)), this is diagnosed "normal".

If $\beta_1 \geq 42$, $\beta_2 \geq 6$, $\beta_3 \geq 45$, and $\beta_4 \geq 60$ (decision criterion (5)), this is diagnosed as "fault".

If the conditions of the decision criterion (4) and the decision criterion (5) are not met, this is diagnosed as "caution".

The diagnosis result is informed to maintenance workers and others by indicating "normal", "caution" or "fault" on the liquid crystal display 10.

The present invention is thus described with reference to the embodiments to which a fault diagnosis method and apparatus based on the vibration measurement is applied, but it will be obvious that the same may be varied in many ways. For example, the present invention can also be applied to a fault diagnosis method and apparatus based on various measured signals such as sound pressure and acoustic emission (AE) being generated simultaneously when vibrations are generated by a fault in the structural system of a machine such as imbalance or misalignment, and distorted waveforms of a rotation axis.

Also, in the above-mentioned embodiments, the present invention is described with reference to a fault diagnosis method and apparatus based on the value of 68.3% of the cumulative frequency distribution of the absolute value of signal waveform data obtained, but the same is not limited to the embodiments described above. For example, the present invention can be applied to a fault diagnosis method and apparatus based on a value with less change between the normal conditions and the fault conditions such as a value (a medium value) of 50% of the cumulative frequency distribution.

As described above, according to the fault diagnosis method of the present invention, since the decision is made by means of dimensionless ratios (i.e. the peak ratio $\beta_1$, the effective value ratio $\beta_2$, the mean value of the third power $\beta_3$, and the mean value of the fourth power $\beta_4$), not by directly using intimation about the amplitude of vibrations being generated by a machine, it is possible to diagnose the fault without being influenced by specifications such as the number of revolutions, electric power consumption, load, and size of the machine.

Similarly, according to the fault diagnosis apparatus of the present invention, since the decision is made by means of dimensionless ratios (i.e. the peak ratio $\beta_1$, the effective value ratio $\beta_2$, the mean value of the third power $\beta_3$, and the mean value of the fourth power $\beta_4$), not by directly using information about the amplitude of vibrations being generated by the machine, it is possible to diagnose the fault without being influenced by specifications such as the number of revolutions, electric power consumption, load, and size of the machine.

The scope of the invention is indicated by the appended claims.

What is claimed is:

1. A fault diagnosis method comprising the steps of:
   detecting vibration waveforms being generated by machinery or equipment;
   obtaining a ratio ($\beta_1$) of a maximum value ($x_p$) of the absolute value of the vibration waveforms with respect to a specific value in a cumulative frequency distribution curve of an amplitude probability density function obtained from the absolute value of the vibration waveforms; and
   diagnosing a degree of fault in the machinery or equipment from the magnitude of the ratio ($\beta_1$).

2. A fault diagnosis method comprising the steps of:
   detecting vibration waveforms being generated by machinery or equipment;
   obtaining a ratio ($\beta_2$) of an effective value ($\sigma$) of the vibration waveforms with respect to a specific value in a cumulative frequency distribution curve of an amplitude probability density function obtained from the absolute value of the vibration waveforms; and diagnosing a degree of fault of the machinery or equipment from the magnitude of the ratio ($\beta_2$).

3. A fault diagnosis method comprising the steps of:

detecting vibration waveforms being generated by machinery or equipment; obtaining a mean value of the third power ($\beta_3$) and a mean value of the fourth power ($\beta_4$) which are statistics, from data of the vibration waveforms normalized with a specific absolute value in a cumulative frequency distribution curve of an amplitude probability density function obtained from the absolute value of the vibration waveforms; and diagnosing a degree of fault of the machinery or equipment from the magnitude of said mean value mean value of the third power ($\beta_3$) and the mean value of the fourth power ($\beta_4$).

4. The fault diagnosis method according to claim 1, wherein the certain specific absolute value of the vibration waveforms in the cumulative frequency distribution curve is an equivalent effective value: $\sigma_{eq}$ of 68.3% of the cumulative frequency.

5. A fault diagnosis apparatus comprising:

vibration detecting means for detecting vibration waveforms being generated by machinery or equipment;

cumulative frequency computing means for obtaining a cumulative frequency distribution curve of an absolute value of the vibration waveforms detected by the vibration detecting means;

maximum value detecting means for obtaining a maximum value ($x_p$) of the vibration waveforms detected byte vibration detecting means;

peak ratio computing means for obtaining a peak ratio ($\beta_1$) of a certain specific value in the cumulative frequency distribution curve computed by the cumulative frequency computing means to the maximum value ($x_p$) computed by the maximum value detecting means; and fault diagnosing means for diagnosing a degree of fault of the machinery or equipment from the magnitude of the peak ratio ($\beta_1$) computed by the peak ratio computing means.

6. A fault diagnosis apparatus comprising:

vibration detecting means for detecting vibration waveforms being generated by machinery or equipment:

cumulative frequency computing means for obtaining a cumulative frequency distribution curve of an absolute value of the vibration waveforms detected by the vibration detecting means;

effective value computing means for obtaining an effective value ($\sigma$) of the vibration waveforms detected by the vibration detecting means;

effective value ratio computing means for obtaining an effective value ratio ($\beta_2$) of a certain specific value in the cumulative frequency distribution curve computed by the cumulative frequency computing means to the effective value ($\sigma$) computed by the effective value computing means; and fault diagnosing means for diagnosing a degree of fault of the machinery or equipment from the magnitude of the effective value ratio ($\beta_2$) computed by the effective value ratio computing means.

7. A fault diagnosis apparatus comprising:

vibration detecting means for detecting vibration waveforms being generated by machinery or equipment;

cumulative frequency computing means for obtaining a cumulative frequency distribution curve of an absolute value of the vibration waveforms detected by the vibration detecting means;

normalizing means for normalizing the vibration waveforms obtained at a certain specific value in the cumulative frequency distribution curve computed by the cumulative frequency computing means;

mean value of the third power and mean value of the fourth computing a means for obtaining a mean value of the third power ($\beta_3$) and a mean value of the fourth power ($\beta_4$) from data normalized by the normalizing means; and fault diagnosing means for diagnosing a degree of fault of the machinery or equipment from the magnitude of the mean value of the third power ($\beta_3$) and the mean value of the fourth power ($\beta_4$) computed by the mean value of the third power and mean value of the fourth power computing means.

8. The fault diagnosis apparatus according to claim 5, wherein the certain specific absolute value of the vibration waveforms in the cumulative frequency distribution curve is an equivalent effective value: $\sigma_{eq}$ of 68.3% of the cumulative frequency.

9. The fault diagnosis method according to claim 2, wherein the certain specific absolute value of the vibration waveforms in the cumulative frequency distribution curve is an equivalent effective value: $\sigma_{eq}$ of 68.3% of the cumulative frequency.

10. The fault diagnosis method according to claim 3, wherein the certain specific absolute value of the vibration waveforms in the cumulative frequency distribution curve is an equivalent effective value: $\sigma_{eq}$ of 68.3% of the cumulative frequency.

11. The fault diagnosis apparatus according to claim 6, wherein the certain specific absolute value of the vibration waveforms in the cumulative frequency distribution curve is an equivalent effective value: $\sigma_{eq}$ of 68.3% of the cumulative frequency.

12. The fault diagnosis apparatus according to claim 7, wherein the certain specific absolute value of the vibration waveforms in the cumulative frequency distribution curve is an equivalent effective value: $\sigma_{eq}$ of 68.3% of the cumulative frequency.

13. The fault diagnosis apparatus according to claim 5, further including:

effective value computing means for obtaining an effective value ($\sigma$) of the vibration waveforms detected by the vibration detecting means; and effective value ratio computing means for obtaining an effective value ratio ($\beta_2$) of the certain specific value in the cumulative frequency distribution curve computed by the cumulative frequency computing means to the effective value ($\sigma$) computed by the effective value computing means; and said fault diagnosing means diagnoses the degree of fault of the machinery or equipment also from the magnitude of the effective value ratio ($\beta_2$) computed by the effective value ratio computing means.

14. The fault diagnosis apparatus according to claim 5, further including: normalizing means for normalizing the vibration waveforms obtained at a certain specific value in the cumulative frequency distribution curve computed by the cumulative frequency computing means;

mean value of the third power and mean value of the fourth power computing means for obtaining a mean value of third power ($\beta_3$) and a mean value of the fourth power ($\beta_4$) from data normalized by the normalizing means; and said fault diagnosing means diagnoses the degree of fault of the machinery or equipment also from the magnitude of the mean value of the third power ($\beta_3$) and the mean value of the fourth power ($\beta_4$) computed by the mean value of the third power and mean value of the fourth power computing means.

15. The fault diagnosis apparatus according to claim 13, further including: normalizing means for normalizing the vibration waveforms obtained at a certain specific value in the cumulative frequency distribution curve computed by the cumulative frequency computing means;

mean value of the third vower and mean value of the fourth power computing means for obtaining a mean value of the third power ($\beta_3$) and a mean value of the fourth power ($\beta_4$) from data normalized by the normalizing means; and said fault diagnosing means diagnoses the degree of fault of the machinery or equipment also from the magnitude of the mean value of the third power ($\beta_3$) and the mean value of the fourth power ($\beta_4$) computed by the mean value of the third power and mean value of the fourth power computing means.

16. The fault diagnosis apparatus according to claim 7, further including:

effective value computing means for obtaining an effective value ($\sigma$) of the vibration waveforms detected by the vibration detecting means; and effective value ratio computing means for obtaining an effective value ratio ($\beta_2$) of the certain specific value in the cumulative frequency distribution curve computed by the cumulative frequency computing means to the effective value ($\sigma$) computed by the effective value computing means; and said fault diagnosing means diagnoses the degree of fault of the machinery or equipment also from the magnitude of the effective value ratio ($\beta_2$) computed by the effective value ratio computing means.

\* \* \* \* \*

UNITED STATES PATENT AND TRADEMARK OFFICE
CERTIFICATE OF CORRECTION

PATENT NO.     : 6,629,058 B2
DATED          : September 30, 2003
INVENTOR(S)    : Hidemichi Komura et al.

It is certified that error appears in the above-identified patent and that said Letters Patent is hereby corrected as shown below:

Title page,
Item [75], Inventors, change "Hidemichi Komura, Kokubunji (JP); Kazuo Shibata, Kokubunji (JP); Kazuhiro Shimomura, Kokubunji (JP)" to -- Hidemichi Komura, Tokyo (JP); Kazuo Shibata, Tokyo (JP); Kazuhiro Shimomura, Tokyo (JP) --.
Item [57] ABSTRACT,
line 2, change "detecting vibration waveforms being generating by machin-" to -- detecting vibration waveforms being generated by machin- --.

Column 3,
Line 38, change "According to a eighth aspect of the present invention, in" to -- According to an eighth aspect of the present invention, in --.

Column 4,
Line 6, change "has a defect in which (a) shows the number of revolutions" to -- has a defect, in which (a) shows the number of revolutions --.

Column 5,
Line 1, change "a normal distribution density function r(x), which is an" to -- a normal distribution density function q(x), which is an --.
Line 7, change "effective value a under normal conditions from an arbitrary" to -- effective value σ under normal conditions from an arbitrary--.
Line 9, change "Therefore, a value equivalent to the effective value □" to -- Therefore, a value equivalent to the effective value σ --.
Line 41, change
"$k(x) = \int_0^\pi |q(x)|dx \qquad (5)$" to
-- $k(x) = \int_0^x |q(x)|dx \qquad (5)$ --.

Line 60, change "that the value obtained is equivalent to the effective value a" to -- that the value obtained is equivalent to the effective value σ--.
Line 67, change "density -function of the flawed bearing shown in FIG. 2, a" to --density function of the flawed bearing shown in FIG. 2, a -.

Column 7,
Line 19, change "Accordingly, in the decision criterion (1) $\beta_1$ = 8.4 and is" to -- Accordingly, in the decision criterion (1), $\beta_1$ = 8.4 and is -.

UNITED STATES PATENT AND TRADEMARK OFFICE
CERTIFICATE OF CORRECTION

PATENT NO. : 6,629,058 B2
DATED : September 30, 2003
INVENTOR(S) : Hidemichi Komura et al.

It is certified that error appears in the above-identified patent and that said Letters Patent is hereby corrected as shown below:

Column 9,
Line 14, change "250 ☐ so as to store 4096 pieces of sampling data $x_i$ in the" to -- 250 $\mu s$ so as to store 4096 pieces of sampling data $x_i$ in the -.
Line 65, change "this is diagnosed "normal"." to -- this is diagnosed as "normal". --.

Column 10,
Line 34, change "using intimation about the amplitude of vibrations being" to -- using information about the amplitude of vibrations being --.

Column 11,
Line 8, change "machinery or equipment; obtaining a mean value of the" to
-- machinery or equipment; obtaining a mean value of the --.
Line 10, change "($\beta_4$) which are statistics, from data of the vibration" to -- ($\beta_4$), which are statistics, from data of the vibration --.
Line 16, change "ment from the magnitude of said mean value mean" to -- ment from the magnitude of said mean --.
Line 22, change "an equivalent effective value, $\sigma_{eq}$ of 68.3 % of the cumula-" to -- an equivalent effective value $\sigma_{eq}$ of 68.3 % of the cumula- --.
Line 33, change "byte vibration detecting means;" to -- by the vibration detecting means; --.
Line 47, change "forms being generated by machinery or equipment, " to -- forms being generated by machinery or equipment; --.

Column 12,
Line 10, change "fourth computing a means for obtaining a mean value" to --fourth power computing means for obtaining a mean value --.
Line 23, change "an equivalent effective value, $\sigma_{eq}$ of 68.3 % of the cumula-" to -- an equivalent effective value $\sigma_{eq}$ of 68. 3 % of the cumula- --.

UNITED STATES PATENT AND TRADEMARK OFFICE
CERTIFICATE OF CORRECTION

PATENT NO. : 6,629,058 B2
DATED : September 30, 2003
INVENTOR(S) : Hidemichi Komura et al.

It is certified that error appears in the above-identified patent and that said Letters Patent is hereby corrected as shown below:

Column 13,
Line 1, change "value of third power ($\beta_3$) and a mean value of the fourth" to -- value of the third power ($\beta_3$) and a mean value of the fourth --.
Line 15, change "mean value of the third vower and mean value of the" to -- mean value of the third power and mean value of the --.

Signed and Sealed this

Seventh Day of September, 2004

JON W. DUDAS
*Director of the United States Patent and Trademark Office*

UNITED STATES PATENT AND TRADEMARK OFFICE
CERTIFICATE OF CORRECTION

PATENT NO.       : 6,629,058 B2
APPLICATION NO.  : 09/836830
DATED            : September 30, 2003
INVENTOR(S)      : Hidemichi Komura et al.

It is certified that error appears in the above-identified patent and that said Letters Patent is hereby corrected as shown below:

Title page,
Item [75], Inventors, change "Hidemichi Komura, Kokubunji (JP); Kazuo Shibata, Kokubunji (JP); Kazuhiro Shimomura, Kokubunji (JP)" to -- Hidemichi Komura, Tokyo (JP); Kazuo Shibata, Tokyo (JP); Kazuhiro Shimomura, Tokyo (JP) --.
Item [57] ABSTRACT,
line 2, change "detecting vibration waveforms being generating by machin-" to -- detecting vibration waveforms being generated by machin- --.

Column 3,
Line 38, change "According to a eighth aspect of the present invention, in" to -- According to an eighth aspect of the present invention, in --.

Column 4,
Line 6, change "has a defect in which (a) shows the number of revolutions" to -- has a defect, in which (a) shows the number of revolutions --.

Column 5,
Line 1, change "a normal distribution density function r(x), which is an" to -- a normal distribution density function q(x), which is an --.
Line 7, change "effective value a under normal conditions from an arbitrary" to -- effective value σ under normal conditions from an arbitrary --.
Line 9, change "Therefore, a value equivalent to the effective value ☐" to -- Therefore, a value equivalent to the effective value σ --.
Line 41, change "$k(x) = \int_0^\pi |q(x)|dx \qquad (5)$" to -- $k(x) = \int_0^x |q(x)|dx \qquad (5)$ --.

Line 60, change "that the value obtained is equivalent to the effective value a" to -- that the value obtained is equivalent to the effective value σ --.
Line 67, change "density -function of the flawed bearing shown in FIG. 2, a" to -- density function of the flawed bearing shown in FIG. 2, a --.

Column 7,
Line 19, change "Accordingly, in the decision criterion (1) $β_1$ = 8.4 and is" to -- Accordingly, in the decision criterion (1), $β_1$ = 8.4 and is --.

UNITED STATES PATENT AND TRADEMARK OFFICE
CERTIFICATE OF CORRECTION

PATENT NO. : 6,629,058 B2
APPLICATION NO. : 09/836830
DATED : September 30, 2003
INVENTOR(S) : Hidemichi Komura et al.

It is certified that error appears in the above-identified patent and that said Letters Patent is hereby corrected as shown below:

Column 9,
Line 14, change "250 □ so as to store 4096 pieces of sampling data $x_i$ in the" to -- 250 $\mu$s so as to store 4096 pieces of sampling data $x_i$ in the --.
Line 65, change "this is diagnosed "normal"." to -- this is diagnosed as "normal". --.

Column 10,
Line 34, change "using intimation about the amplitude of vibrations being" to -- using information about the amplitude of vibrations being --.

Column 11,
Line 8, change "machinery or equipment; obtaining a mean value of the" to
-- machinery or equipment;
obtaining a mean value of the --.
Line 10, change "($\beta_4$) which are statistics, from data of the vibration" to -- ($\beta_4$), which are statistics, from data of the vibration --.
Line 16, change "ment from the magnitude of said mean value mean" to -- ment from the magnitude of said mean --.
Line 22, change "an equivalent effective value: $\sigma_{eq}$ of 68.3 % of the cumula-" to -- an equivalent effective value $\sigma_{eq}$ of 68.3 % of the cumula- --.
Line 33, change "byte vibration detecting means;" to -- by the vibration detecting means; --.
Line 47, change "forms being generated by machinery or equipment:" to -- forms being generated by machinery or equipment; --.

Column 12,
Line 10, change "fourth computing a means for obtaining a mean value" to -- fourth power computing means for obtaining a mean value --.
Line 23, change "an equivalent effective value: $\sigma_{eq}$ of 68.3 % of the cumula-" to -- an equivalent effective value $\sigma_{eq}$ of 68. 3 % of the cumula- --.

UNITED STATES PATENT AND TRADEMARK OFFICE
CERTIFICATE OF CORRECTION

| | |
|---|---|
| PATENT NO. | : 6,629,058 B2 |
| APPLICATION NO. | : 09/836830 |
| DATED | : September 30, 2003 |
| INVENTOR(S) | : Hidemichi Komura et al. |

It is certified that error appears in the above-identified patent and that said Letters Patent is hereby corrected as shown below:

Column 13,
Line 1, change "value of third power ($\beta_3$) and a mean value of the fourth" to -- value of the third power ($\beta_3$) and a mean value of the fourth --.
Line 15, change "mean value of the third vower and mean value of the" to -- mean value of the third power and mean value of the --.

This certificate supersedes Certificate of Correction issued September 7, 2004.

Signed and Sealed this

Nineteenth Day of September, 2006

JON W. DUDAS
*Director of the United States Patent and Trademark Office*